2 Sheets—Sheet 1.

R. MILLER & J. D. HILLSON.
GATE.

No. 174,276. Patented Feb. 29, 1876.

WITNESSES
Robert Everett
George E. Upham

INVENTORS
Richard Miller
James D. Hillson
Chipman and Fosmire
ATTORNEYS

2 Sheets—Sheet 2.

R. MILLER & J. D. HILLSON.
GATE.

No. 174,276. Patented Feb. 29, 1876.

WITNESSES
Robert Everitt
George E. Shaw

INVENTORS
Richard Miller,
James D. Hillson,
ATTORNEYS

UNITED STATES PATENT OFFICE.

RICHARD MILLER AND JAMES D. HILLSON, OF STEPHENSVILLE, WISCONSIN.

IMPROVEMENT IN GATES.

Specification forming part of Letters Patent No. 174,276, dated February 29, 1876; application filed October 24, 1874.

*To all whom it may concern:*

Be it known that we, RICHARD MILLER and JAMES DELOS HILLSON, both of Stephensville, in the county of Outagamie and State of Wisconsin, have invented a new and valuable Improvement in Gates; and we do hereby declare that the following is a full, clear, and exact description of the construction and operation of the same, reference being had to the annexed drawings, making a part of this specification, and to the letters and figures of reference marked thereon.

Figure 1:
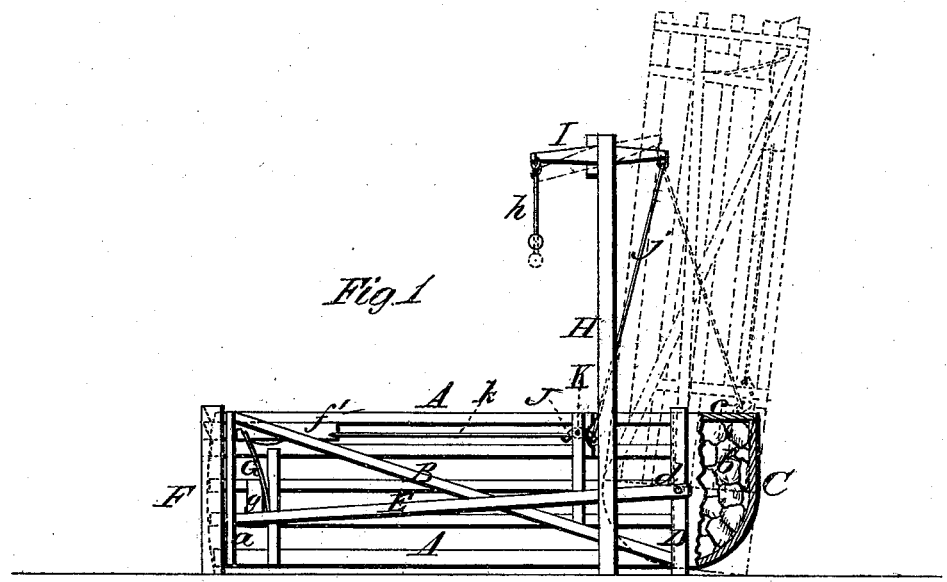
Figure 2:
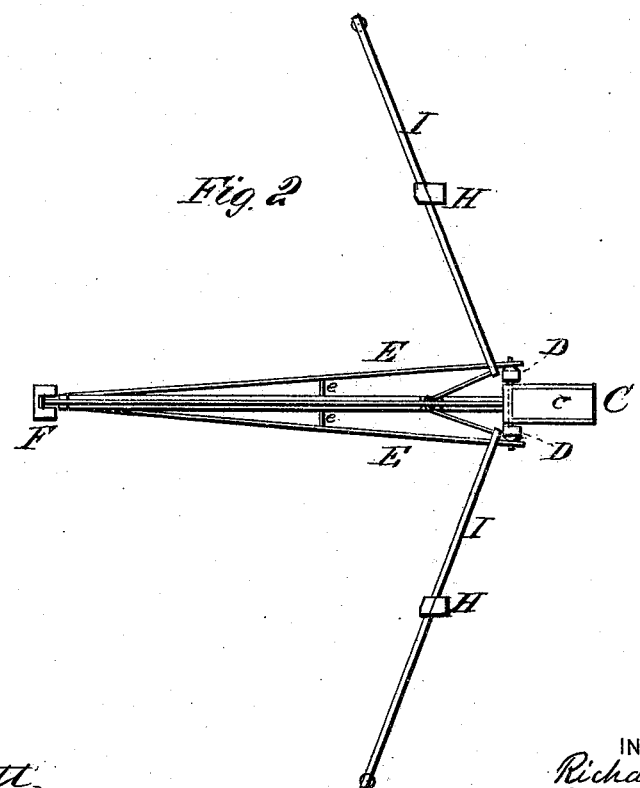
Figure 3:
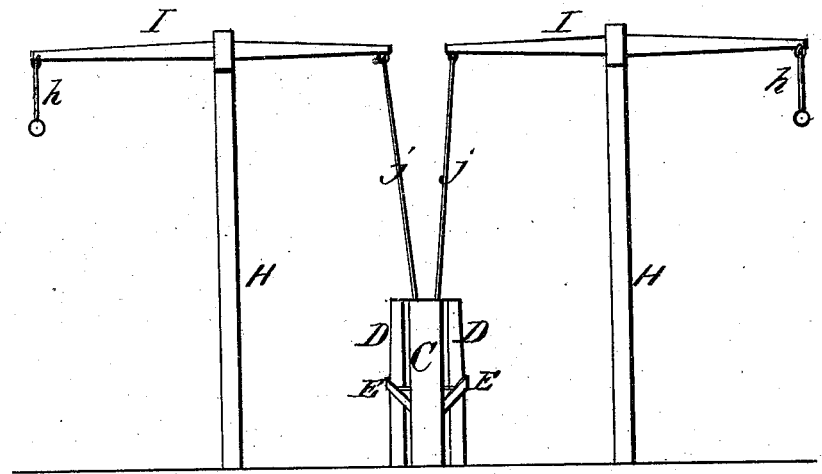
Figure 4:
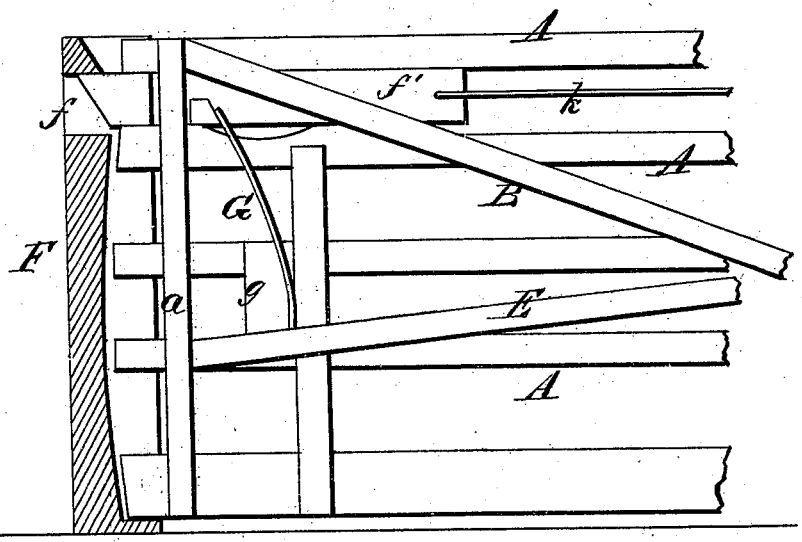

Figure 1 of the drawing is a representation of a side elevation of our gate. Fig. 2 is a plan view and Fig. 3 an end view of the same. Fig. 4 is a detail view.

This invention has relation to a gate for which we made application for Letters Patent on the 27th day of June, A. D. 1874.

Our object is to improve this gate by the employment on a gate which is hung so that it will vibrate vertically, and which is balanced by a counter-weight on one end, of certain levers, pull-wires, and connecting rods or wires, in combination with an angular lever on the gate, which lever is connected to an endwise-movable latch, so that by pulling down on the pull-wires the angular lever automatically draws back the movable latch, and allows the gate to be thrown up, as will be hereinafter more fully explained.

Our improved vertically-vibrating gate is composed of horizontal boards A, diagonal braces B, and perpendicular braces a, rigidly secured at the free end of the gate and at the pivoted end by a block, C, as represented in the annexed drawings, which block has a weight-receiving box, b, covered by a slide, c.

D D designate two posts, between which said gate is applied and pivoted at d, so as to allow a vertical vibration to be given to the gate in the act of opening and shutting it.

E E designate two or more side braces, which are rigidly secured to the free end of the gate, and are connected to the fulcrum-pin d, on which the gate vibrates, and are sustained at two or more points on the gate by braces e. These braces E E sustain the gate against lateral displacement by the force of the wind when the gate is thrown up, and in opening and shutting it. The block C has a rounded lower end, and when the gate is thrown up, as indicated in dotted lines in Fig. 1, the upper corner of the block rests on the ground. In the box b sand, stone, or other weight is put for the purpose of balancing the gate. When the gate is shut the free end rests in a grooved post, F, which has a curved groove in it to allow the corresponding curved free end of the gate free vibration. In the post F is a latch-hole, f, in which the beveled end of an endwise-movable latch, f', passes, which is secured between the two upper horizontal boards A, and moved by means of a spring, G, which is secured to the gate and latch by little blocks g g', as shown.

H designates a perpendicular post, which is placed at a convenient distance on each side of the gate, to the upper end of which is pivoted a vibrating lever, I, having a pull-rod, h, with a weight, i, attached to its free end, and a connecting rod or wire, j, leading from its attached end to an angular lever, J, which is pivoted on the gate at a point, K, and connected by a rod or wire, k, to the endwise-movable latch S, so that by pulling on either of the pull-rods h the angular lever J automatically draws back the latch f' out of the post-hole f, allowing the gate to be drawn up by either one of the levers I beyond its center of gravity, so that the upper corner of the block C rests on the ground, as shown in dotted lines in Fig. 1. After passing through, the gate is shut by pulling on the pull-rods, which throws the gate back and it falls; at the same time the latch S automatically fastens the gate.

It will be seen from the above description and accompanying drawings that the gate can be opened and shut without alighting from a carriage.

We are aware that a vertically-vibrating gate, operated by levers and pull rods or chains, has heretofore been employed, and we therefore lay no claim, broadly, to such invention.

What we claim is—

The hollow weighted receptacle C, forming a continuation of the gate, and having its lower end rounded and its upper end provided with a slide, c, in combination with the side braces E E, rigidly secured to the forward end of the gate, and also to the diagonal braces B B, and connected with the fulcrum-pin $d$, on which the gate vibrates, posts H H, and levers I, the whole constructed and operating in the manner and for the purpose set forth.

In testimony that we claim the above we have hereunto subscribed our names in the presence of two witnesses.

RICHARD MILLER.
JAMES DELOS HILLSON.

Witnesses:
WILLIAM McGEE,
F. L. CROSS.